(12) United States Patent (10) Patent No.: US 12,617,090 B2

Fujisawa (45) Date of Patent: May 5, 2026

---

(54) TERMINAL DEVICE

(71) Applicant: DAIHEN CORPORATION, Osaka (JP)

(72) Inventor: Sho Fujisawa, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 57 days.

(21) Appl. No.: 18/643,528

(22) Filed: Apr. 23, 2024

(65) Prior Publication Data

US 2025/0135641 A1 May 1, 2025

(30) Foreign Application Priority Data

Oct. 31, 2023 (JP) ................................. 2023-186726

(51) Int. Cl.
B25J 9/16 (2006.01)

(52) U.S. Cl.
CPC ........... B25J 9/1664 (2013.01); B25J 9/1692 (2013.01); B25J 9/1697 (2013.01); G05B 2219/36167 (2013.01); G05B 2219/37097 (2013.01)

(58) Field of Classification Search
CPC ...... B25J 9/1664; B25J 9/1692; B25J 9/1697; B25J 13/08; B25J 11/005; B25J 19/023; G05B 2219/36167; G05B 2219/37097; G05B 2219/36159; G05B 2219/39008;
(Continued)

(56) References Cited

U.S. PATENT DOCUMENTS

| | | | | |
|---|---|---|---|---|
| 8,082,064 | B2 * | 12/2011 | Kay | ....................... B25J 9/1697 700/214 |
| 9,919,427 | B1 * | 3/2018 | Guilbert | ................ B25J 9/1664 |
| 12,157,229 | B2 * | 12/2024 | Nakagawa | ................ G06T 7/73 |

(Continued)

FOREIGN PATENT DOCUMENTS

| | | |
|---|---|---|
| EP | 4177837 | 5/2023 |
| JP | 6420229 B | 11/2018 |

(Continued)

OTHER PUBLICATIONS

Korean Office Action issued on Oct. 31, 2025, in Korean Patent Application No. 10-2024-0040412 with English Language Machine Translation.

*Primary Examiner* — Abby Lin
*Assistant Examiner* — Karston G. Evans
(74) *Attorney, Agent, or Firm* — Sterne, Kessler, Goldstein & Fox P.L.L.C.

(57) ABSTRACT

A terminal device is configured to photograph a first image including a work target and a marker for the work target, and a second image including a robot marker, the work target, and the marker for the work target, which maintain a positional relation in the first image, set a user coordinate system using the marker for the work target as a reference, set an operation path based on a work spot of the work target included in the first image, create a work program based on the set operation path of the industrial robot, calculate a robot coordinate system based on the robot marker included in the second image and position attitude information of the industrial robot, and modify the work program by converting a coordinate system of the operation path of the industrial robot from the user coordinate system to the robot coordinate system.

5 Claims, 6 Drawing Sheets

(58) Field of Classification Search
CPC ........... G05B 2219/40538; G05B 2219/40609;
G05B 2219/45104; G05B 19/42
See application file for complete search history.

(56) References Cited

U.S. PATENT DOCUMENTS

| | | | |
|---|---|---|---|
| 12,337,474 B2 * | 6/2025 | Ikeguchi ............... | B23K 9/0953 |
| 2013/0006421 A1 * | 1/2013 | Brogardh ............... | B25J 9/1692 |
| | | | 700/254 |
| 2013/0147777 A1 | 6/2013 | Lau | |
| 2017/0165841 A1 | 6/2017 | Kamoi | |
| 2019/0077016 A1 * | 3/2019 | Atohira ................ | G05B 19/182 |
| 2019/0232499 A1 * | 8/2019 | Tan ......................... | B25J 9/1617 |
| 2020/0143564 A1 * | 5/2020 | Ross ....................... | B25J 9/1697 |
| 2021/0162600 A1 * | 6/2021 | Clever ................... | B25J 9/1605 |
| 2023/0106119 A1 | 4/2023 | Nakagawa | |
| 2023/0147777 A1 | 5/2023 | Ikeguchi | |
| 2023/0219231 A1 * | 7/2023 | Okada ....................... | G06T 7/73 |
| | | | 700/259 |
| 2023/0249340 A1 | 8/2023 | Kitagawa | |

FOREIGN PATENT DOCUMENTS

| | | |
|---|---|---|
| JP | 7190552 B | 12/2022 |
| JP | 2003-047279 | 4/2023 |
| JP | 7423851 B | 1/2024 |
| KR | 2023-0043704 A | 3/2023 |
| KR | 2023-0120078 A | 8/2023 |

* cited by examiner

Fig. 6

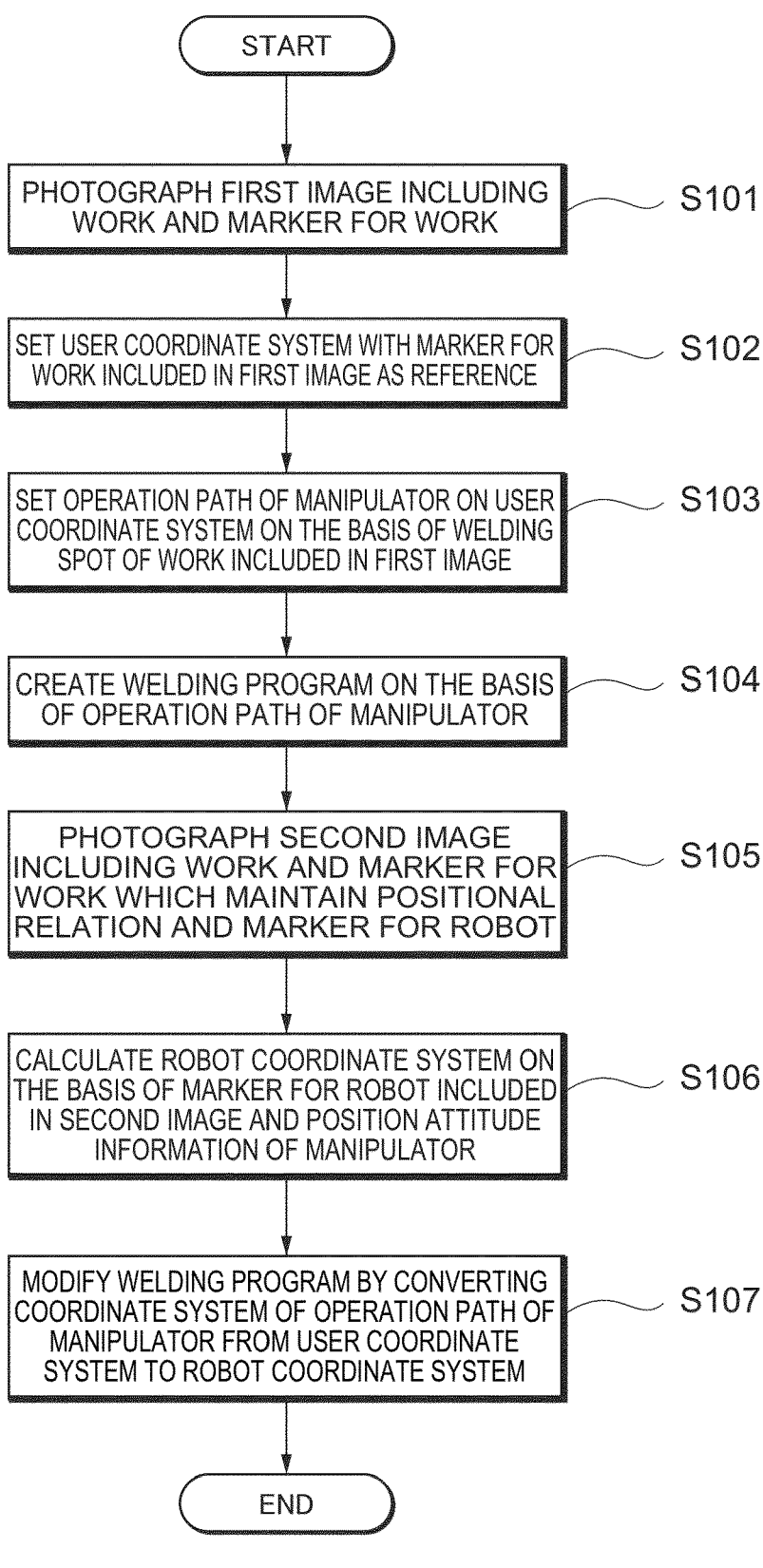

START

PHOTOGRAPH FIRST IMAGE INCLUDING WORK AND MARKER FOR WORK — S101

SET USER COORDINATE SYSTEM WITH MARKER FOR WORK INCLUDED IN FIRST IMAGE AS REFERENCE — S102

SET OPERATION PATH OF MANIPULATOR ON USER COORDINATE SYSTEM ON THE BASIS OF WELDING SPOT OF WORK INCLUDED IN FIRST IMAGE — S103

CREATE WELDING PROGRAM ON THE BASIS OF OPERATION PATH OF MANIPULATOR — S104

PHOTOGRAPH SECOND IMAGE INCLUDING WORK AND MARKER FOR WORK WHICH MAINTAIN POSITIONAL RELATION AND MARKER FOR ROBOT — S105

CALCULATE ROBOT COORDINATE SYSTEM ON THE BASIS OF MARKER FOR ROBOT INCLUDED IN SECOND IMAGE AND POSITION ATTITUDE INFORMATION OF MANIPULATOR — S106

MODIFY WELDING PROGRAM BY CONVERTING COORDINATE SYSTEM OF OPERATION PATH OF MANIPULATOR FROM USER COORDINATE SYSTEM TO ROBOT COORDINATE SYSTEM — S107

END

TERMINAL DEVICE

BACKGROUND

Field

The present invention relates to a terminal device which can create a work program for a robot.

Description of Related Art

Conventionally, for creating a program for causing a robot to operate, there is an art of creation by using an image photographed by a camera. In the art in the Japanese Patent No. 7190552, for example, a program for causing the robot to operate is created by using an image including the robot, to which a marker being photographed by a camera is attached, and a welding target. In the art in the Japanese Patent No. 6420229, a program for causing the robot to operate is created by superimposing a virtual image such as an effector of the robot on an image of an actual space including the robot photographed by a camera.

SUMMARY

However, with the arts in the Japanese Patent No. 7190552 and the Japanese Patent No. 6420229, when a program is to be created, an image including the robot needs to be photographed. Therefore, while the program is being created, the robot is occupied, which lowers an operation rate of the robot.

Thus, this disclosure has an object to provide a terminal device which can create a work program without lowering the operation rate of the robot.

A terminal device according to an aspect of this disclosure includes a first photographing portion which photographs a first image including a work target and a marker for the work target, a user-coordinate system setting portion which sets a user coordinate system, with the marker for the work target that is included in the first image being a reference, an operation-path setting portion which sets an operation path of an industrial robot on the user coordinate system on the basis of a work spot of the work target included in the first image, a program creating portion which creates a work program for causing the industrial robot to operate on the basis of the set operation path of the industrial robot, a second photographing portion which photographs a second image including a robot marker attached to the industrial robot in addition to the work target and the marker for a work target which, maintain a positional relation in the first image, a robot-coordinate system calculating portion which calculates a robot coordinate system on the basis of the robot marker included in the second image and position attitude information of the industrial robot, and a program modifying portion which modifies the work program by converting a coordinate system of the operation path of the industrial robot from the user coordinate system to the robot coordinate system.

According to this aspect, by photographing the first image including the work target and the marker for a work target, the user coordinate system is set, with the maker for work target being a reference, and the work program of the industrial robot can be created on the basis of the operation path of the industrial robot on the user coordinate system set on the basis of the work spot of the work target. And by photographing the second image including the work target and the marker for the work target, which maintain the positional relation in the first image and a robot marker attached to the industrial robot, the robot coordinate system based on the marker for robot and the position attitude information of the industrial robot is calculated, and the work program can be modified by converting the coordinate system of the operation path of the industrial robot from the user coordinate system to the robot coordinate system.

As a result, the work program of the industrial robot on the user coordinate system is created in advance on the basis of the first image not including the industrial robot and on the basis of the second image to which the robot marker mounted on the industrial robot to be photographed after that is added, the coordinate system indicating the operation path of the industrial robot is converted from the user coordinate system to the robot coordinate system, and the work program based on the user coordinate system can be modified to the work program based on the robot coordinate system.

In the aforementioned aspect, the program modifying portion may convert the coordinate system of the operation path of the industrial robot on the basis of a difference between an origin of the user coordinate system and an origin of the robot coordinate system.

According to this aspect, the coordinate system of the operation path of the industrial robot can be converted on the basis of the difference between the origin of the user coordinate system and the origin of the robot coordinate system.

In the aforementioned aspect, the user-coordinate system setting portion may calculate the origin and the coordinate axes of the user coordinate system, with the marker for the work target being a reference.

According to this aspect, the work program of the industrial robot can be created on the basis of the origin and the coordinate axes of the user coordinate system calculated, with the marker for the work target being a reference.

In the aforementioned aspect, the robot-coordinate system calculating portion may calculate the origin and the coordinate axes of the robot coordinate system on the basis of the robot marker and the position attitude information of the industrial robot.

According to this aspect, the work program of the industrial robot can be modified by using the origin of the robot coordinate system calculated with the robot marker as a reference and the coordinate axes of the robot coordinate system calculated on the basis of the position attitude information of the industrial robot.

In the aforementioned aspect, the position attitude information of the industrial robot may include angle information of each axis of the industrial robot obtained from the robot control device which controls the operation of the industrial robot.

According to this aspect, by using the angle information of each axis of the industrial robot obtained from the robot control device, accuracy of calculating the coordinate axis of the robot coordinate system can be improved.

According to this disclosure, the terminal device which can create the work program can be provided without lowering the operation rate of the robot.

BRIEF DESCRIPTION OF DRAWINGS

FIG. 6 is a flowchart for explaining an example of an operation of the terminal device.

DETAILED DESCRIPTION

With reference to the attached drawings, a preferred embodiment of this disclosure will be explained. It is to be noted that, in each drawing, those with the same signs have the same or similar configurations. Moreover, since the drawings are schematic, dimensions and ratios of each of constituent elements are different from actual ones.

Figure 1:
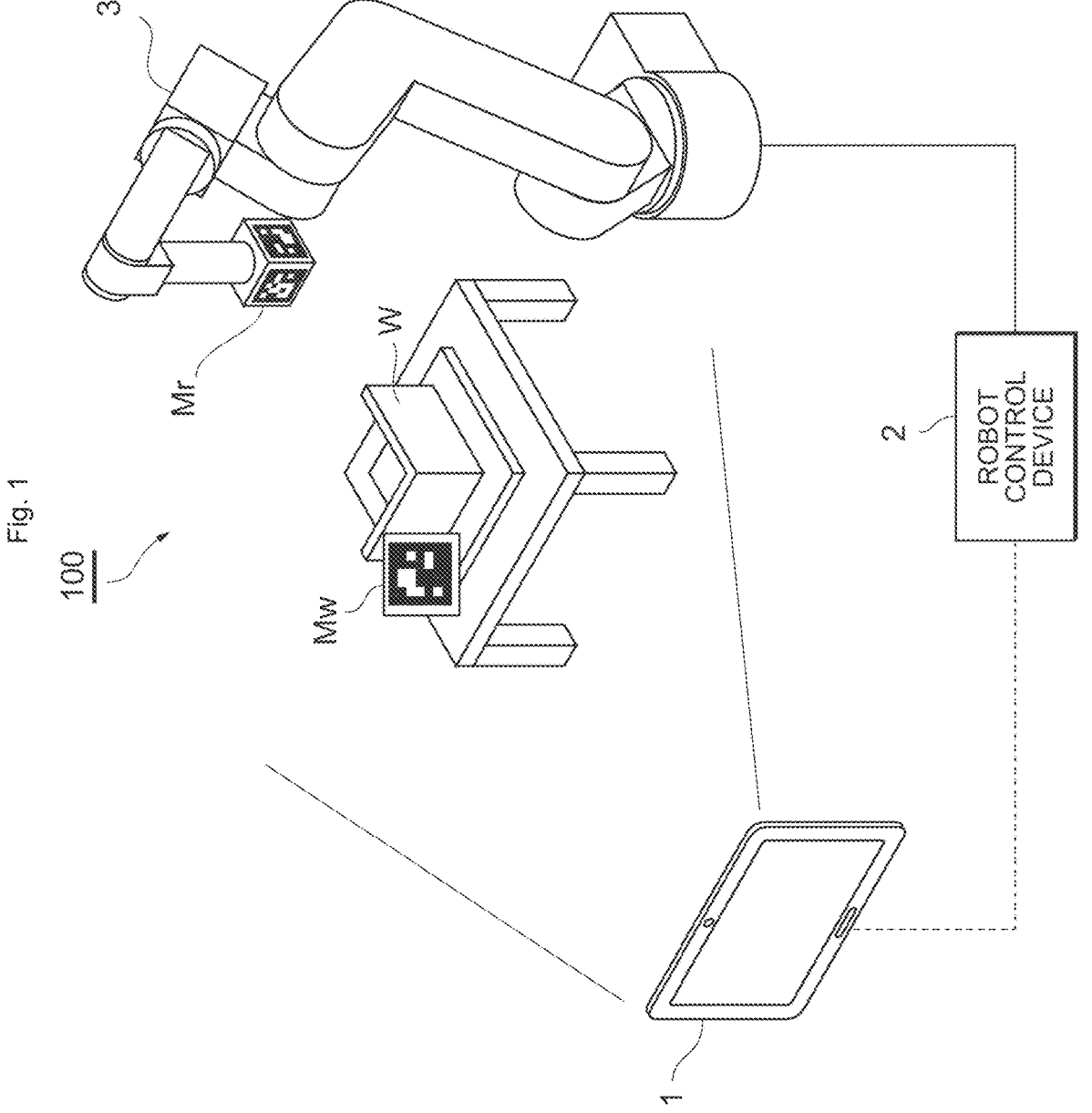
FIG. 1 is a diagram exemplifying a system configuration of a welding robot system including a terminal device according to an Embodiment.

FIG. 1 is a diagram exemplifying a system configuration of a welding robot system 100 including a terminal device 1 according to an Embodiment. The welding robot system 100 includes a terminal device 1, a robot control device 2, and a manipulator (industrial robot) 3, for example. The terminal device 1 and the robot control device 2 as well as the robot control device 2 and the manipulator 3 are connected to each other via a network, respectively. The terminal device 1 and the robot control device 2 are connected via wireless communication such as WiFi (Wireless Fidelity), for example, and the robot control device 2 and the manipulator 3 are connected via a communication cable, for example. It is to be noted that the network may be wired (including a communication cable) or wireless.

It is to be noted that the welding robot system 100 may include a teach pendant. The teach pendant is an operating device which can be connected to the robot control device 2 and is used when a worker teaches an operation of the manipulator 3.

The manipulator 3 is a welding robot which performs arc welding to a work W, which is a welding target, in accordance with a performing condition set in the robot control device 2. The manipulator 3 has an articulated arm provided on a base member fixed to a floor surface or the like of a plant and a welding torch (tool) coupled with a distal end of the articulated arm, for example.

To a distal end part of the articulated arm of the manipulator 3, a marker Mr for robot is attached, and a marker Mw for work is disposed on a work W.

The marker Mr for robot and the marker Mw for work only need to be identifiers whose presence can be recognized by the terminal device 1, but preferably, an AR marker may be used. By using the AR marker, when the AR marker is recognized, display of the user coordinate system with the AR marker as an origin superimposed on an actual image can be easily realized.

Figure 2:
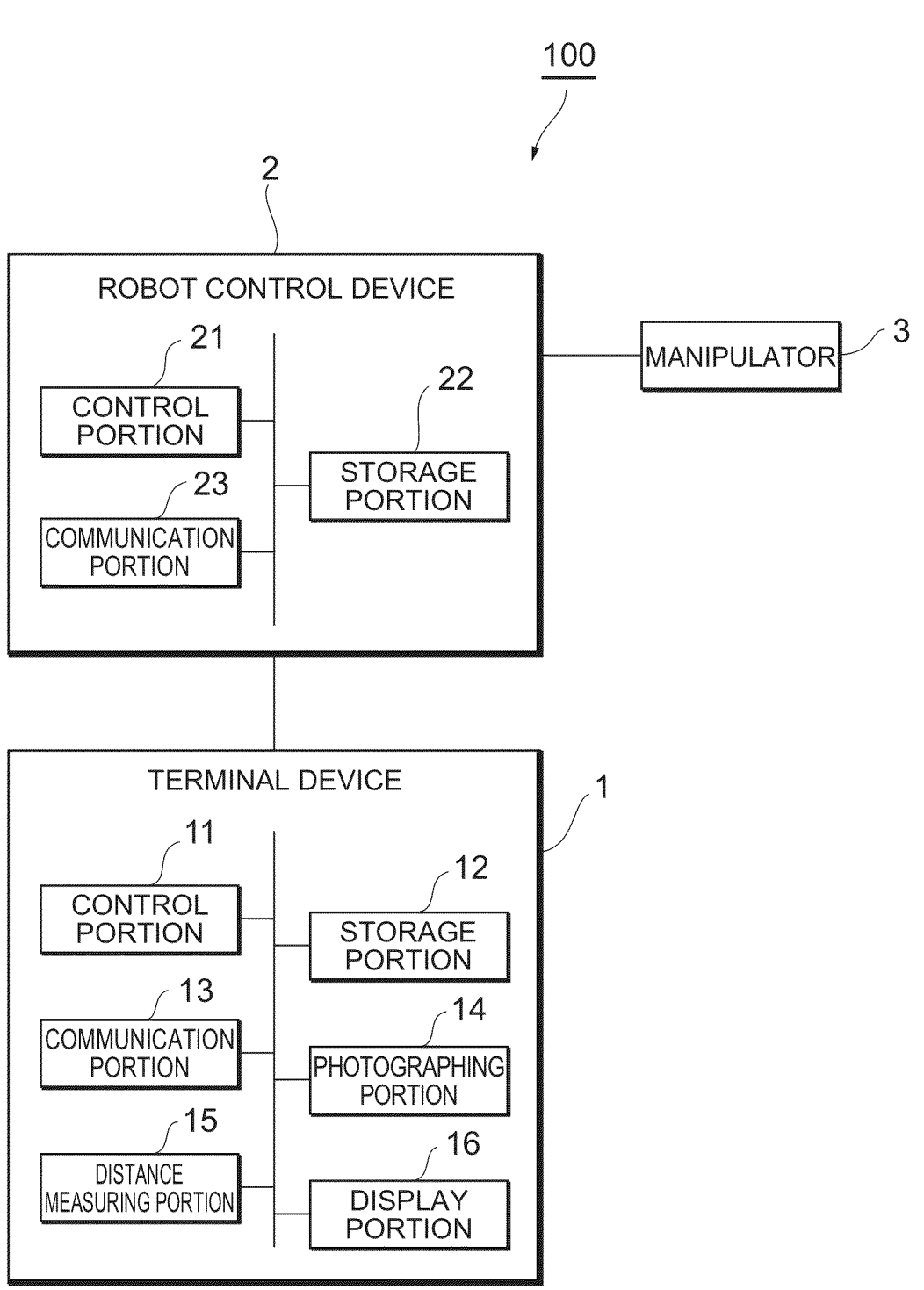
FIG. 2 is a diagram exemplifying a physical configuration of the terminal device and a robot control device shown in FIG. 1.

With reference to FIG. 2, configurations of the robot control device 2 and the terminal device 1 will be explained in order in the following.

The robot control device 2 is a control unit that controls an operation of the manipulator 3 and includes a control portion 21, a storage portion 22, and a communication portion 23, for example.

The control portion 21 is a processor and controls the manipulator 3 by executing a welding program or the like stored in the storage portion 22.

The communication portion 23 is a communication interface and controls communication with the terminal device 1 and the manipulator 3 connected via the network.

It is to be noted that the robot control device 2 may further include a welding power-source portion. The welding power-source portion supplies a welding current, a welding voltage and the like to the manipulator 3 in accordance with a welding performing condition set in advance in order to generate arc between the distal end of the welding wire and the work W, for example. The welding power-source portion may be provided separately from the robot control device 2.

The terminal device 1 is a portable terminal with a digital camera, for example. The portable terminal includes, for example, terminals capable of being carried such as a tablet terminal, a smartphone, a personal digital assistance (PDA), a note PC (personal computer) and the like. The terminal device 1 includes, for example, a control portion 11, a storage portion 12, a communication portion 13, a photographing portion 14, a distance measuring portion 15, and a display portion 16.

The control portion 11 is a processor and controls each part of the terminal device 1 by executing a program stored in the storage portion 12.

The storage portion 12 is a computer-readable recording medium and stores programs for realizing various functions of the terminal device 1 and various types of data used in the programs and the like.

The communication portion 13 is a communication interface and controls communication with the robot control device 2 connected via the network.

The photographing portion (a first photographing portion, a second photographing portion) 14 is a 2D camera including a lens and an image sensor (image pickup element), for example, and converts light of a subject received by the lens into an electric signal (digital image data).

Figure 3:
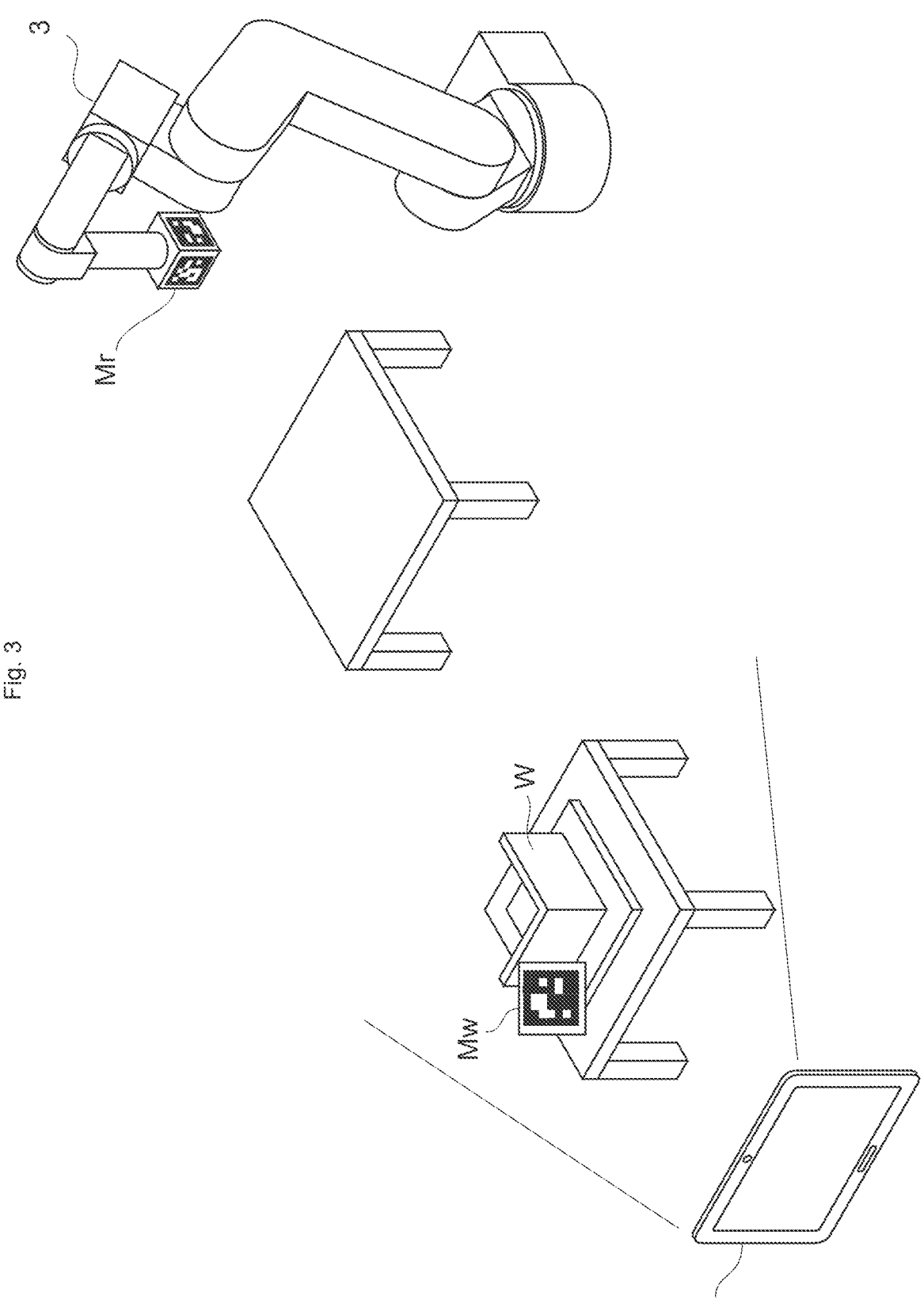
FIG. 3 is a schematic diagram for explaining a first image photographed by a photographing portion.
Figure 4:
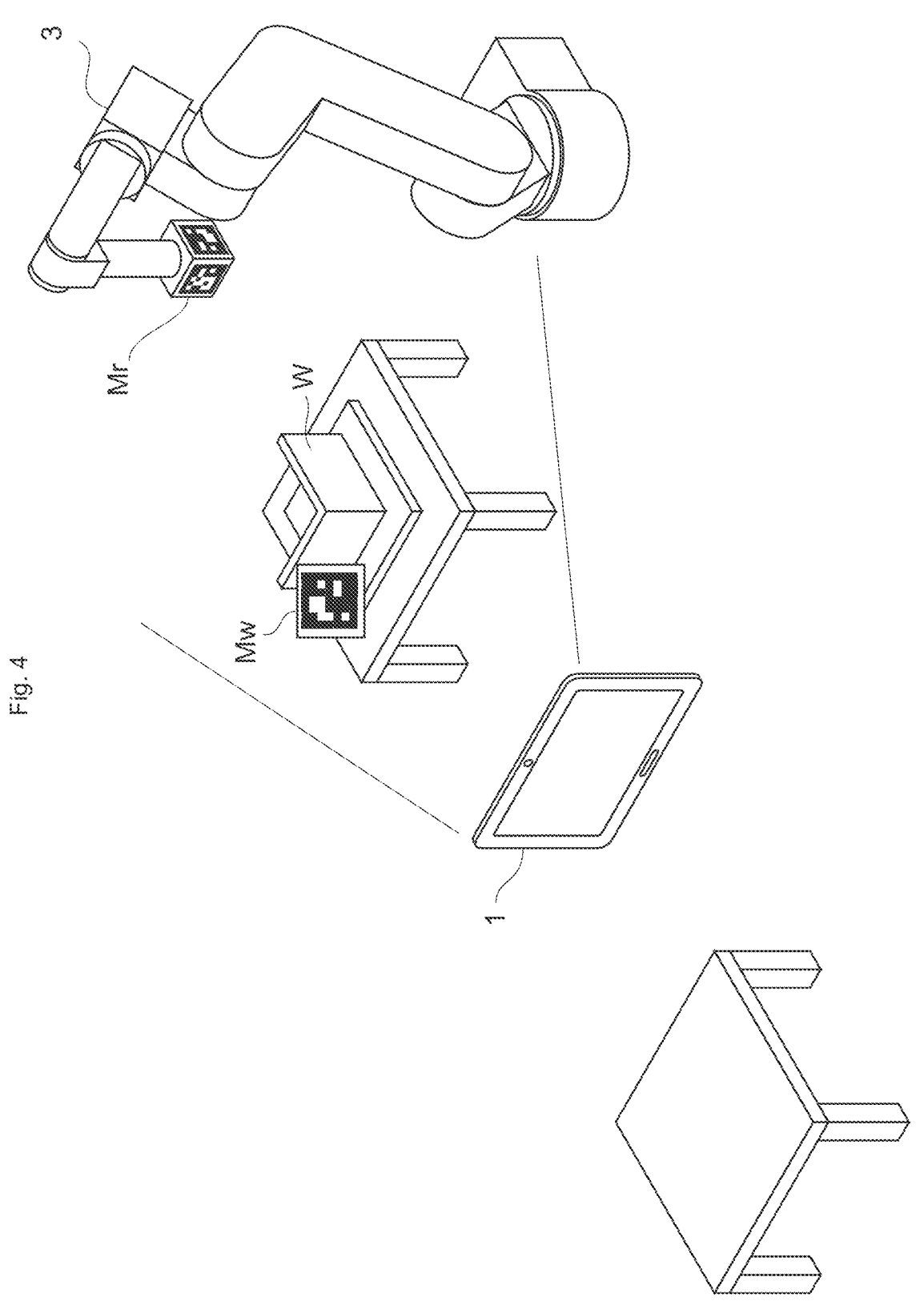
FIG. 4 is a schematic diagram for explaining a second image photographed by a photographing portion.

Here, in this Embodiment, the photographing portion 14 exemplarily photographs two types of images, that is, a first image and a second image. With reference to FIG. 3 and FIG. 4, the first image and the second image will be explained.

As shown in FIG. 3, the first image photographed by the photographing portion 14 includes the work W, which is a welding target of the manipulator 3, and a marker for work (marker for welding target) Mw disposed on the work W. The first image does not have to include the manipulator 3. Therefore, when the first image is to be photographed, the manipulator 3 can perform the welding work at a work place (a robot cell, for example) located at a place different from the place where the work W is present, for example.

As shown in FIG. 4, the second image photographed by the photographing portion 14 includes the work W and the marker Mw for work which maintain the positional relation in the first image and the marker Mr for robot attached to the manipulator 3. When the second image is to be photographed, it is only necessary to move the work W and the marker Mw for work included in the first image to the work place of the manipulator 3. It is to be noted that the manipulator 3 with a cart may be moved to the work place where the work W and the marker Mw for work are present.

The distance measuring portion 15 in FIG. 2 is a 3D camera on which a distance measuring sensor is mounted, for example. The distance measuring sensor is a sensor capable of measuring a distance to a target. As the distance measuring sensor, a LIDAR (Light Detection and Ranging) sensor, a millimeter wave sensor, a supersonic sensor and the like can be used, for example.

It is to be noted that the distance measuring portion 15 may be only either one of the 3D camera and the distance measuring sensor. In a case of only the 3D camera, it is preferable that three-dimensional coordinate data corresponding to the object is calculated on the basis of a plurality of images obtained by photographing the object from a plurality of different positions. In this case, a three-dimensional measurement method by a publicly-known stereo method can be used.

Here, by including the distance measuring sensor in the terminal device 1, a positional relation between the image sensor and the distance measuring sensor can be fixed, and timing to obtain data by each sensor can be matched. As a result, processing efficiency of setting a specified position of the marker Mw for work, which will be described later, on point-group data can be improved, for example.

The display portion 16 is a display having a touch panel, for example, for displaying an image of a subject photographed by the photographing portion 14 and for receiving an input of an operation instruction or the like by a worker. The display portion 16 may be provided as a display device having a touch panel separately from the terminal device 1, for example.

Figure 5:
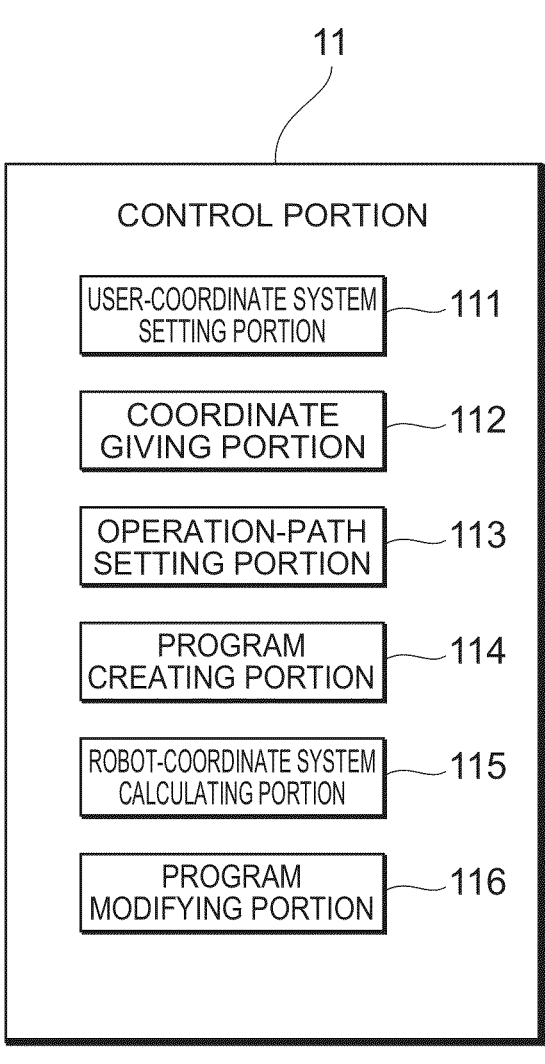
FIG. 5 is a diagram exemplifying a functional configuration in a control portion of the terminal device shown in FIG. 2.

FIG. 5 is a diagram exemplifying a functional configuration in the control portion 11 of the terminal device 1 according to the Embodiment. The control portion 11 of the terminal device 1 has, as a functional configuration, a user-coordinate system setting portion 111, a coordinate giving portion 112, an operation-path setting portion 113, a program creating portion 114, a robot-coordinate system calculating portion 115, and a program modifying portion 116.

The user-coordinate system setting portion 111 sets a three-dimensional user coordinate system with the marker Mw for work included in the first image photographed by the photographing portion 14 as a reference. The first image includes the work W and the marker Mw for work as shown in FIG. 3.

Specifically, the user-coordinate system setting portion 111 calculates the three-dimensional coordinate axis (direction) with a specified position of the marker Mw for work (a corner of the marker, a center of the marker or the like, for example) as the origin and sets the user coordinate system.

It is to be noted that the origin of the user coordinate system is not limited to the specified position of the marker Mw for work. For example, it may be an origin of a provisional robot coordinate system determined with the specified position of the marker Mw for work as a reference. The provisional robot coordinate system can be set as a coordinate system of a virtual model by placing the virtual model of the manipulator beside the work W, for example. By fixing the position of the marker Mw for work with respect to the virtual model of the manipulator, the specified position of the marker Mw for work can be specified on the provisional robot coordinate system. The user coordinate system in this case can be handled as the provisional robot coordinate system.

It may be configured such that a position where the virtual model of the manipulator is placed can be arbitrarily specified by a worker who touches or the like an image of a work space in accordance with guidance in sound or by a character message or the like, for example.

The coordinate giving portion 112 in FIG. 5 gives a coordinate on the user coordinate system to point-group data obtained by the distance measuring portion 15 which measures a distance to an object included in the image photographed by the photographing portion 14. Hereinafter, specific explanation will be made.

The coordinate giving portion 112 detects the specified position of the marker Mw for work on the basis of the first image and sets the specified position of the detected marker Mw for work on the point-group data obtained by the distance measuring portion 15. The coordinate giving portion 112 gives the coordinate on the user coordinate system with the specified position of the marker Mw for work set on the point-group data as the origin (reference) to the point-group data.

As a result, the point-group data can be drawn as data of the user coordinate system. Regarding the specified position of the marker Mw for work set on the point-group data, the specified position of the marker Mw for work on the point-group data may be automatically recognized by data analysis or may be specified by the worker's pointing out of the specified position of the marker Mw for work on the point-group data or the like, for example.

The operation-path setting portion 113 sets the operation path of the manipulator 3 on the user coordinate system on the basis of a welding spot of the work W included in the first image.

Exemplarily, the operation-path setting portion 113 sets the operation path of the virtual model of the manipulator so that the welding torch coupled with the distal end of the virtual model of the manipulator operates along the welding spot of the work W in the first image. The operation path may be set by the user's manual selection or set automatically by calculating a distance between the welding spot of the work W and the welding torch.

Moreover, the welding spot of the work W may be selected by detecting candidates for the welding spot on the basis of the point-group data and through selection by the user from the detected candidates for the welding spot or may be selected by detecting the candidates for the welding spot through image processing of the first image and through selection by the user from the detected candidates for the welding spot. When the welding spot is to be selected, a welding order of the welding spots, a welding direction or the like may be selected or specified by the user.

The program creating portion 114 creates a welding program for welding the welding spot of the work W included in the first image on the basis of the operation path of the manipulator 3 on the user coordinate system set by the operation-path setting portion 113.

The robot-coordinate system calculating portion 115 calculates the robot coordinate system on the basis of the marker Mr for robot included in the second image photographed by the photographing portion 14 and the position attitude information of the manipulator 3. The second image includes, as shown in FIG. 4, the work W and the marker Mw for work which maintain the positional relation in the first image and the marker Mr for robot attached to the manipulator 3.

Specifically, the robot-coordinate system calculating portion 115 calculates the robot coordinate system by calculating the origin of the robot coordinate system on the basis of the marker Mr for robot and by calculating the coordinate axis (direction) of the robot coordinate system on the basis of the position attitude information of the manipulator 3.

Here, the robot control device 2 holds the coordinate on the robot coordinate system corresponding to the attached position of the marker Mr for robot and the position attitude information of the manipulator 3 controlled by the robot control device 2. The position attitude information of the manipulator 3 includes the angle information of each axis of the manipulator 3, for example.

Contents of the position attitude information of the manipulator 3 might change depending on the type of the manipulator 3 and thus, when the position attitude information of the manipulator 3 is to be obtained from the robot control device 2, the type of the manipulator 3 may be obtained with that. In this case, the robot-coordinate system calculating portion 115 preferably calculates the coordinate axis (direction) of the robot coordinate system on the basis of the position attitude information of the manipulator 3 and the type of the manipulator 3.

The program modifying portion 116 in FIG. 5 modifies the welding program by converting the coordinate system of the operation path of the manipulator 3 from the user coordinate system to the robot coordinate system.

Exemplarily, the program modifying portion 116 calculates a difference between the origin of the user coordinate system and the origin of the robot coordinate system and moves the coordinate of the operation path of the manipulator 3 on the user coordinate system on the basis of the calculated difference.

As a result, the coordinate of the operation path can be converted from the user coordinate system to the robot coordinate system. The program modifying portion 116 modifies the welding program created by the program creating portion 114 so that it is expressed by the coordinate on the robot coordinate system after the coordinate conversion.

The program modifying portion 116 transmits the modified welding program to the robot control device 2 and causes it to be stored in the storage portion 22 of the robot control device 2. As a result, the control portion 21 of the robot control device 2 can control the manipulator 3 so that the welding spot of the work W included in the second image is welded in accordance with the modified welding program.

With reference to FIG. 6, an example of the operation of the terminal device 1 will be explained.

First, the photographing portion 14 of the terminal device 1 photographs the first image including the work W, which is a welding target of the manipulator 3, and the marker Mw for work disposed on the work W (Step S101).

Subsequently, the user-coordinate system setting portion 111 of the terminal device 1 sets the three-dimensional user coordinate system with the marker Mw for work included in the first image photographed at the aforementioned Step S101 as a reference (Step S102).

Subsequently, the operation-path setting portion 113 of the terminal device 1 sets the operation path of the manipulator 3 on the user coordinate system on the basis of the welding spot of the work W included in the first image (Step S103).

Subsequently, the program creating portion 114 of the terminal device 1 creates the welding program for welding the welding spot of the work W included in the first image on the basis of the operation path of the manipulator 3 on the user coordinate system set at the aforementioned Step S103 (Step S104).

Subsequently, the photographing portion 14 of the terminal device 1 photographs the second image including the work W and the marker Mw for work which maintain the positional relation in the first image and the marker Mr for robot attached to the manipulator 3 (Step S105).

Subsequently, the robot-coordinate system calculating portion 115 of the terminal device 1 calculates the robot coordinate system on the basis of the marker Mr for robot and the position attitude information of the manipulator 3 included in the second image photographed at the aforementioned Step S105 (Step S106).

Subsequently, the program modifying portion 116 of the terminal device 1 converts the coordinate system of the operation path of the manipulator 3 set at the aforementioned Step S103 from the user coordinate system to the robot coordinate system so as to modify the welding program created at the aforementioned Step S104 (Step S107). And this operation is finished.

As described above, according to the terminal device 1 according to the Embodiment, the user coordinate system with the marker Mw for work as a reference is set by photographing the first image including the work W and the marker Mw for work, and the welding program of the manipulator 3 can be created on the basis of the operation path of the manipulator 3 on the user coordinate system set on the basis of the welding spot of the work W. Then, the robot coordinate system based on the marker Mr for robot and the position attitude information of the manipulator 3 is calculated by photographing the second image including the work W and the marker Mw for work which maintain the positional relation in the first image and the marker Mr for robot attached to the manipulator 3, and the welding program can be modified by converting the coordinate system of the operation path of the manipulator 3 from the user coordinate system to the robot coordinate system.

As a result, the welding program of the manipulator 3 on the user coordinate system is created in advance on the basis of the first image not including the manipulator 3, the coordinate system indicating the operation path of the manipulator 3 is converted from the user coordinate system to the robot coordinate system on the basis of the second image to which the marker Mr for robot attached to the manipulator 3 to be photographed after that is added, and the welding program based on the user coordinate system can be modified to the welding program based on the robot coordinate system.

Thus, according to the terminal device 1 according to the Embodiment, an occupancy rate of the manipulator 3 when the welding program is to be created can be lowered and thus, the welding program can be created without lowering the operation rate of the manipulator 3.

It is to be noted that this disclosure is not limited to the aforementioned Embodiment but can be worked in the other various forms within the range not departing from the gist of this disclosure. Therefore, the aforementioned Embodiment is only exemplification and should not be interpreted in a limited manner.

For example, in the aforementioned Embodiment, the explanation was made by using the welding robot, but this is not limiting. For example, this disclosure can be applied to industrial robots including a handling robot performing picking or the like. In this case, the welding program, the welding target, the welding spot, and the welding operation used in the aforementioned Embodiment can be replaced with a work program, a work target, a work spot, and a work, respectively.

What is claimed is:

1. A terminal device, comprising:
   a photographing portion configured to photograph a first image that includes a work target and a marker for the work target, and a second image that includes a robot marker that is attached to an industrial robot, the work target, and the marker for the work target, wherein the work target and the marker for the work target are configured to maintain a positional relation in the first image, and wherein the photographing portion is configured to capture the first image at a first location so that the first image does not include the robot marker, and to capture the second image at a second location that is different from the first location so that the robot marker is included in the second image;

a user-coordinate system setting portion configured to set a user coordinate system, using the marker for the work target that is included in the first image as a reference;

an operation-path setting portion configured to set an operation path of the industrial robot on the user coordinate system on the basis of a work spot of the work target included in the first image;

a program creating portion configured to create a work program for causing the industrial robot to operate on the basis of the set operation path of the industrial robot;

a robot-coordinate system calculating portion configured to calculate a robot coordinate system on the basis of the robot marker included in the second image and position attitude information of the industrial robot; and a program modifying portion configured to modify the work program by converting a coordinate system of the operation path of the industrial robot from the user coordinate system to the robot coordinate system

.

2. The terminal device according to claim 1, wherein the program modifying portion is configured to convert the coordinate system of the operation path of the industrial robot on the basis of a difference between an origin of the user coordinate system and an origin of the robot coordinate system.

3. The terminal device according to claim 1, wherein the user-coordinate system setting portion is configured to calculate an origin of the user coordinate system and coordinate axes using the marker for the work target as a reference.

4. The terminal device according to claim 1, wherein the robot-coordinate system calculating portion is configured to calculate an origin and coordinate axes of the robot coordinate system on the basis of the robot marker and position attitude information of the industrial robot.

5. The terminal device according to claim 1, wherein the position attitude information of the industrial robot includes angle information of each axis of the industrial robot obtained from a robot control device which controls an operation of the industrial robot.

\* \* \* \* \*